United States Patent Office 3,455,505
Patented July 15, 1969

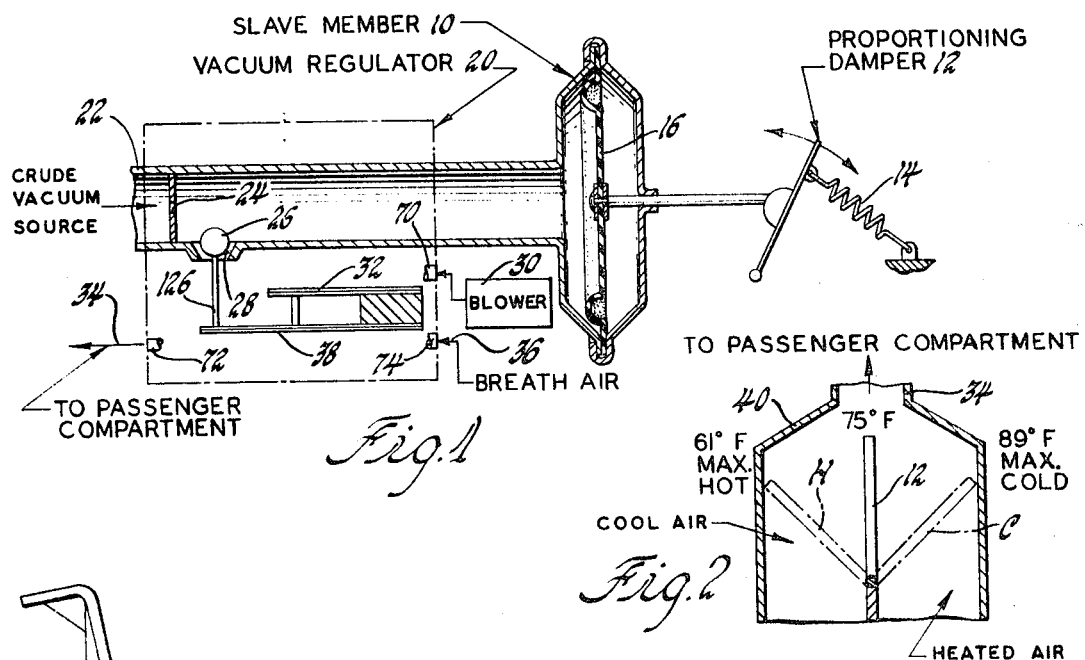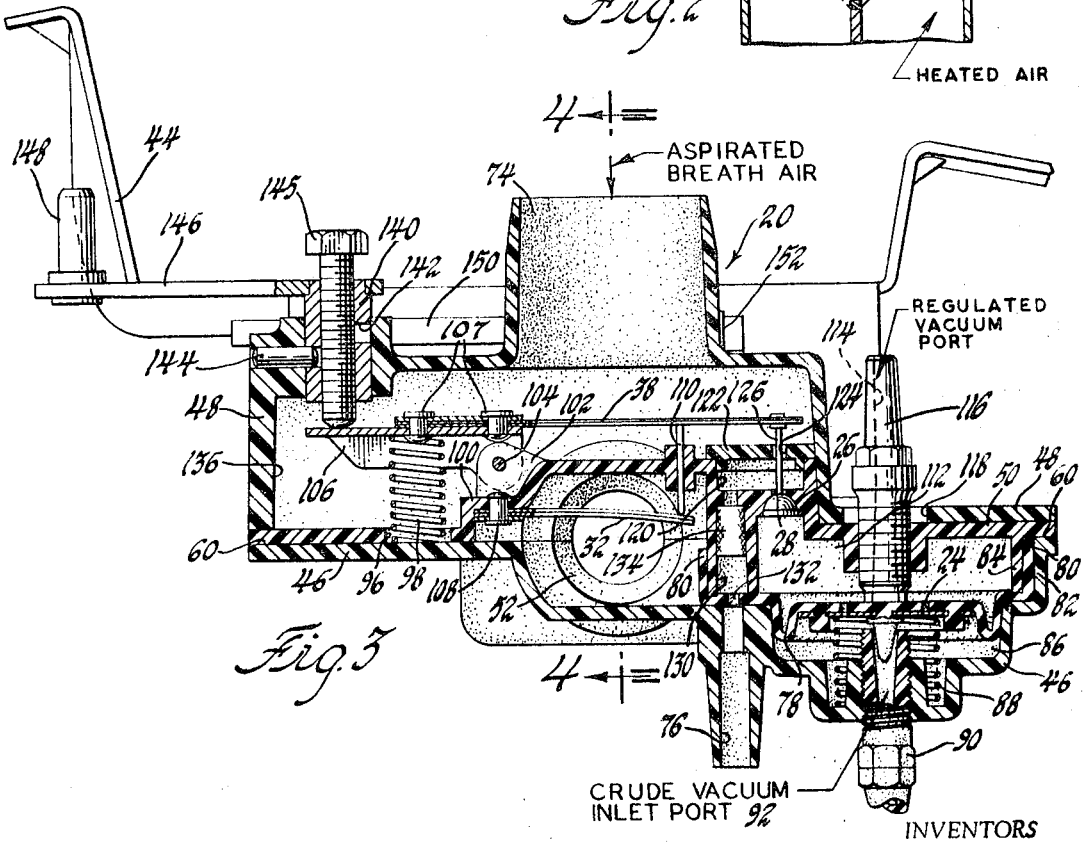

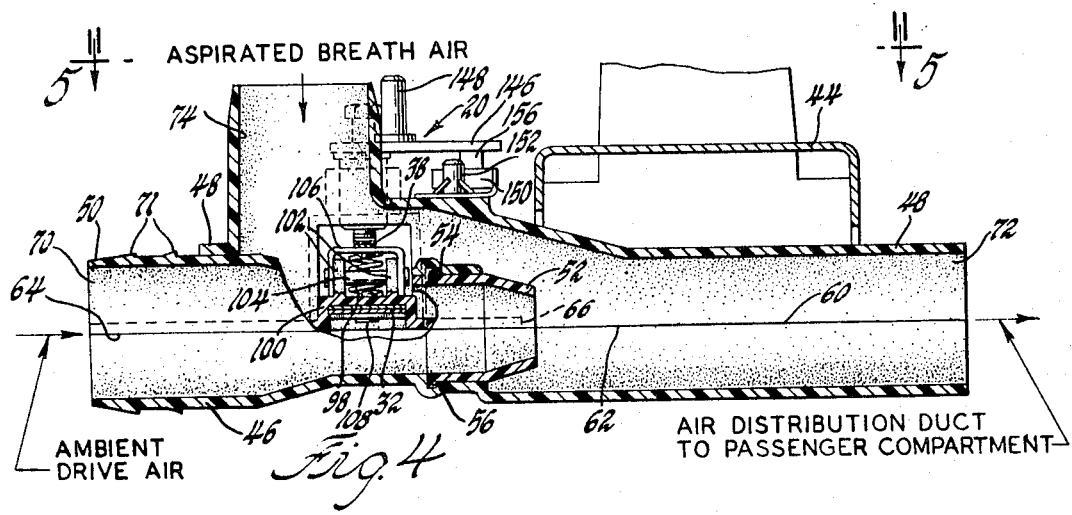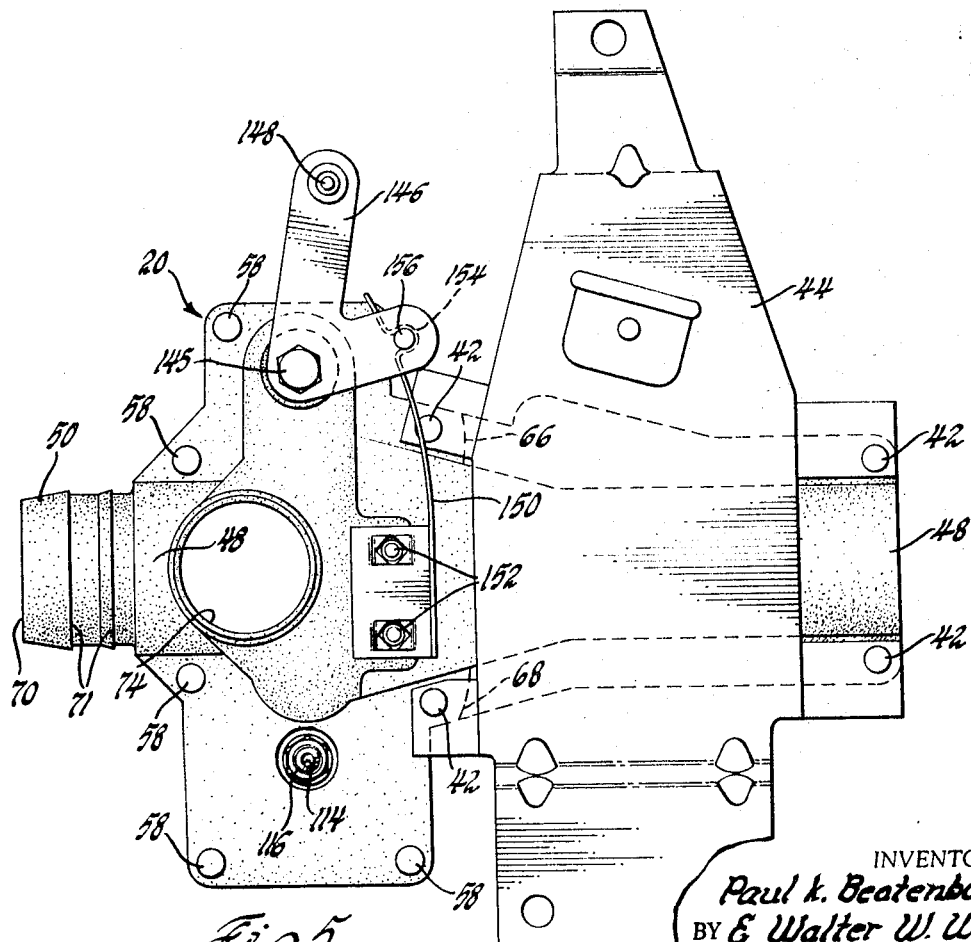

3,455,505
COMPARTMENT TEMPERATURE CONTROL SYSTEM AND THERMOSTATIC VACUUM REGULATOR
Paul K. Beatenbough, Medina, and Walter W. Weiss, Tonowanda, N.Y., assignors to General Motors Corporation, Detroit, Mich., a corporation of Delaware
Filed Nov. 27, 1967, Ser. No. 685,924
Int. Cl. G05d 23/00; F16t 1/00
U.S. Cl. 236—87                                    10 Claims

ABSTRACT OF THE DISCLOSURE

A compartment temperature control system including a vacuum regulator for gaining a control vacuum in accordance with ambient temperature and temperature in a compartment or chamber supplied with air by a single blower so that the control vacuum may be used to operate a slave member such as a damper for affecting or compensating for changes in the ambient and compartment temperatures.

SPECIFICATION

This invention relates to a vacuum regulator and a control system and more particularly to a vacuum regulator and a system using that regulator for gaining a control vacuum corresponding with and sensing a temperature condition in a chamber, so that a change in that condition may be compensated for by operation of a slave member by the control vacuum and with the slave member controlling the condition.

A system for proportioning the flow of air from two sources, ambient and in automobile passenger compartment, to gain or maintain a desired temperature in the latter is disclosed in the U.S. Patent application Ser. No. 611,928 filed Jan. 26, 1967, now Patent No. 3,373,934, in the names of W. K. Kolbe and E. W. Yott. This patented disclosure necessitates the use of two blowers—a main air circulating blower for ventilation purposes and a supplementary blower for sensing purposes. This together with other components being separately mounted and used, is an aspect of considerable cost and added installation and maintenance expense.

An object of the present invention is to provide an improved control system and a thermostatic vacuum regulator for that system of compact construction in the use of which the temperature of air from two sources may be effective in modulating a vacuum with only a ventilation blower being needed to gain the desired air flow for both temperature control and ventilation aspects involved.

A feature of the present invention is a vacuum regulator having a body defining two converging paths of air with each traversing a separate temperature sensitive element and one of the paths being defined by a nozzle giving an aspirator or suction effect on the other.

Another feature is a temperature control system for a compartment, the system employing only one blower for a dual purpose—supplying ventilation air and effecting a temperature sensing for the system.

These and other important features of the invention will now be described in detail and then pointed out more particularly in the appended claims.

In the drawings:

FIGURE 1 is a schematic view of the principal components of a system embodying features of the present invention;

FIGURE 2 is a schematic view representing three angular positions of a damper, the latter being one component of the system shown in FIGURE 1;

FIGURE 3 is a sectional view of a vacuum regulator showing structural details in a unitary assemblage as utilized in the system of FIGURE 1;

FIGURE 4 is a sectional view looking in the direction of the arrows 4—4 in FIGURE 3; and FIGURE 5 is an elevational view looking in the direction of the arrows 5—5 in FIGURE 4.

In FIGURE 1 is depicted a vacuum diaphragm motor 10 herein termed a "slave member" and a proportioning damper or heat regulating element 12. The latter is urged to rotate in one direction by a spring 14 and in the other direction by a vacuum diaphragm 16. The slave member 10 as well as a vacuum regulator indicated as a unit at 20 are in a vacuum line 22 leading from a crude vacuum source such as an internal combustion engine intake manifold (not shown). The vacuum regulator 20 is represented in FIGURE 1 by means of elements included within a block drawn in dot and dash lines. The regulator 20 includes a portion of the vacuum line 22 having a restrictor or metering opening 24 and also a valve 26 and bleed aperture 28 arrangement therein. A main ventilation blower 30 is provided to blow ambient air through the regulator 20 and intimately in contact with a bimetal 32 and to a discharge as at 34 leading to a passenger compartment. Breath or passenger compartment air is pulled into the regulator 20 at 36 to contact a bimetal 38 before joining the ambient air from the blower 30 and then discharging at 34. It will be noted that no blower, other than the blower 30, is used to urge air through the regulator 20 and that this blower 30 is the sole driving means for all proportioned air flow as controlled by the proportioning damper 12.

The disclosure of application Ser. No. 611,928 is not like that represented in the present FIGURE 1 because of the omission of at least two important aspects or improvements provided by the present invention. No supplementary or auxiliary blower is now provided for breath air and an improved vacuum relay valve shown in detail in FIGURES 2 to 5 inclusive is made a part of the regulator 20 rather than as a separate component requiring separate mounting and added connections. The improved vacuum relay valve herein disclosed is similar in some respects to the relay valve shown in the U.S. application Ser. No. 679,905, filed Nov. 1, 1967, in the names of P. K. Beatenbough and G. E. Richards and entitled "Vacuum Control System."

In FIGURE 2, the damper 12 is shown in an intermediate position in duct work 40 so that a proportion of cool air and heated air is mixed to discharge air at 75° F. to the passenger compartment, the temperature of which is being controlled. If the damper 12 is placed in position C, maximum cold air is discharged under an 89° F. ambient condition. If positioned at H, maximum hot air is discharged under a 61° F. ambient condition. These temperatures are given as merely illustrative situations.

FIGURES 3, 4, and 5 show the vacuum regulator 20 as being held by means of four rivets 42 (FIGURE 5) on a supporting bracket 44 of sheet metal. Conveniently, such a bracket may be fastened to a car fire wall or on the cowl. The body of the regulator has two main plastic parts 46 and 48 joined together with a third plastic part 50 interposed and a nozzle 52 (FIGURE 4) retained by semicircular grooves 54 and 56 formed in the parts 50 and 46 respectively. Added rivets 58 hold the parts 46, 48, 50, and 52 together.

The under body part 46 has a flat top surface 60. The upper body part 48 has two flat surfaces 62 and 64 on its bottom and meeting at narrow strips 66 and 68 (FIGURE 5) butting an edge of the interposed body part 50. The parts 46 and 50 define an ambient air inlet tube 70 with annular ridges 71 facilitating the connection of an ambient air inlet hose for guiding forced air from the blower 30. Parts 48 and 46 define an air distribution discharge passage 72 for guiding air into the passenger compartment. The passage 72 is enlarged around the nozzle 52 to form an inlet for breath air. This inlet converges with the passage 72 so that breath air entering at 74 can flow down and to the right as seen in FIGURE 4 and be drawn into the discharge path from the nozzle 52.

The body part 46 has a depending nipple 76 to which relatively clean air may be led. A flexible diaphragm 78 has a marginal and cylindrical portion 80 restrained for most of its circumference by nesting of margins 82 and 84 of the part 46 and the part 50 respectively. A stepped and depending portion of the body part 46 cooperates with the diaphragm 78 in defining a crude vacuum chamber 86. A spring 88 is retained in the chamber and acts against the diaphragm. A nipple 90 provides a crude vacuum inlet port 92 which is controlled by the diaphragm 78. This port corresponds with the left end of the vacuum line 22 in FIGURE 1. A metering opening 24 is formed in the diaphragm 78 and this opening corresponds with the opening 24 in FIGURE 1.

The interposed body part 50 has a cut-out portion 96 (FIGURE 3) receiving one end of a spring 98. It also has a raised portion 100 with two upstanding and integral ears 102 (FIGURE 4) in which a pivot pin 104 is mounted. A sheet metal arm 106 of U-shaped cross section has one end journaled on the pin and carries one end of a bimetal element 38 with the aid of rivets 107. A rivet 108 on the underside of the raised portion 100 holds one end of a bimetal element 32 (see FIGURE 1) which traverses the passage through the air inlet tube 70. A pin 110 is slidable in the body part 50 and its ends abut the bimetal elements 32 and 38 so that each bimetal affects the tension in the other. The spring 98 tends to rotate the arm 106 about the pin 104 in a clockwise direction as viewed in FIGURE 3.

The body part 50 cooperates with the diaphragm 78 in defining a control or regulated vacuum chamber 112 from which leads a regulated vacuum port 114 in a nipple 116. The nipple extends through an opening 118 formed in the upper body part 48. A recess or clean air pocket 120 formed in the part 50 has a fixed cover 122 with an aperture 124 freely receiving a stem 126. The latter connects a valve 26 (see FIGURE 1) with the free end of the bimetal element 38. The valve 26 controls a bleed aperture 28 connecting the clean air pocket 120 with the chamber 112. The part 50 also defines a passage 130 connecting the pocket 120 with the bore of the nipple 76 through an aperture 132 in the fixed margin of the diaphragm 78. A filter 134 is retained in the passage 130.

The body part 48 has a large recess 136 receiving the arm 106, both bimetal elements 32 and 38 and parts of the body part 50. This recess 136 also forms the passage for breath air from the entrance 74 and which converges with the path of air discharge from the nozzle 52 as best seen in FIGURE 4. A sleeve 140 (FIGURE 3) is journaled in the part 48 and bears a cam or spiral slot 142 extending part away around its axis. A pin 144 is fixed in the body part 48 and extends into the slot 142 for giving axial movement to the sleeve 140 and a bolt 145 therein when turned. A bellcrank 146 is fixed to the sleeve 140. The inner end of the bolt 145 abuts the arm 106 and serves as a stop. A pin 148 on the bellcrank 146 is adapted to be moved about the sleeve 140 axis by a Bowden wire not shown.

One end of a single leaf spring 150 (FIGURE 5) is locked to two prongs 152 integral with the body part 48. The free end of this spring is formed into a loop or detent 154 for retaining a pin 156 depending from an arm of the bellcrank 146. The spring 150 is shown as a convenient device for calibrating the regulator 20 prior to installation and connection of a Bowden wire to the bellcrank pin 146. After installation the spring 150 is freed from the pin 156 and calibration is complete. The spring 150 has no function during operation of the system and is designed with a spring force to move it away from any interference areas when it is unlocked at 154.

It will be appreciated that as described in Ser. No. 679,905, above referred to, the vacuum acting on the slave member diaphragm 16 and in the port 114 is maintained at a fixed increment above the vacuum in the chamber 112 regardless of fluctuation of the crude vacuum in part 92 or the vacuum in chamber 112.

It will also be understood that, although only a damper 12 is described or a temperature control element, the mechanical motion imparted by the slave member 10 may also be used to regulate speed of the blower 30 or to angularly position an outside air or recirculated air door.

Although previous automotive heating and air conditioning systems often use three sensors, it has been found that the two bimetal sensors 32 and 38 may be given enough sensitivity and response to gain and maintain passage compartment temperature.

In the operation of the vacuum regulator 20, the two bimetal elements 32 and 38 are mutually effected by the push-pin 110 and are arranged as a cantilever spring pulling on the valve 26. Vacuum in the chamber 112 pulls on the other or chamber 112 side of the valve. If the spring tension is set for a given vacuum, say five inches of mercury, and the air temperature at 74 and 70 remains constant, the vacuum force in one direction and the cantilever spring force (developed by elements 32 and 38) in the other direction are balanced. If the vacuum in the chamber 112 should drift upward, the increased vacuum pulls the valve 26 open and more air bleeds past the valve to maintain the original five inches of vacuum. Thus, diaphragm 78 will function in cooperation with the valve and bleed aperture arrangement to maintain constant vacuum output as the crude vacuum in port 92 changes.

If the temperature of air at 70 or 74 rises, the bimetal spring tension increases, the valve 26 is pulled closer to its seat, less air bleeds past the valve, and the vacuum in the chamber 112 increases. This provides a thermostatic vacuum regulator, for as the temperature increases, the vacuum output increases proportionately, and as the temperature decreases, the vacuum decreases proportionately.

In applying the regulated vacuum output to operate the slave member 10 and hence the damper 12, an increased regulated vacuum in part 114 (or at the right end of line 22 in FIGURE 1) will pull harder against the return spring 14. This will move the damper 12 to a new position delivering colder air. Thus, the damper angle and the discharge air temperature at 72 are each proportional to the vacuum in part 114. The operation of the damper 12 to gain the effect is clear in the schematic representation of FIGURE 2.

The clean air pocket 120 is particularly advantageous for it has been found that air bearing cigarette smoke entering at 74 could otherwise precipitate tars on the seat of the valve 26 and impair the vacuum regulation and damper control. It will be appreciated that the regulator 20 for an automobile and as depicted in FIGURE 4 is only slightly less than six inches in length so that the mechanical parts and the apertures are small.

We claim:

1. A temperature control system for a compartment, said system comprising a heat regulating element such as a damper, a vacuum and spring operated slave member operatively linked to said element, a vacuum line leading to said slave member, a vacuum regulator in said vacuum line, an air duct and a blower in operative combination to force ambient air into said compartment, a body at least partially defining said air duct, an air passage leading from said compartment and converging with said duct in said body to form an aspirator, a thermally responsive element in said air duct, a thermally responsive element in said air passage, a valve and bleed aperture arrangement adapted to admit air to said vacuum line, and means connecting said valve and bleed aperture arrangement to said thermally responsive elements to modify the vacuum in said vacuum line for actuating said heat regulating element through operation of said slave member.

2. A temperature control system as set forth in claim 1, said body confining said vacuum regulator and said thermally responsive elements in a unitary assemblage.

3. A temperature control system as set forth in claim 1, and unitary means for adjusting said thermally responsive elements and said valve and bleed aperture arrangement.

4. A temperature control system as set forth in claim 1, said body defining a clean air pocket in communication with said valve and bleed aperture arrangement.

5. A temperature control system as set forth in claim 1, for adjusting said thermally responsive elements and valve, and single means for locking said adjusting means in position to facilitate calibration.

6. A vacuum regulator composing a body defining two air passages converging to form an aspirator, a thermally responsive element in each of said passages, a valve and bleed aperture arrangement leading from one of said passages, and means connecting both thermally responsive elements to said valve and bleed aperture arrangement for operating the latter.

7. A vacuum regulator as set forth in claim 6, a control vacuum chamber and a crude vacuum chamber being defined by said body, a flexible diaphragm separating said chambers, ports leading from said chambers and controlled by said diaphragm, spring means urging said diaphragm toward said control vacuum chamber, a metering opening passing through said diaphragm, said valve and bleed aperture arrangement leading to said control vacuum chamber, and means for connecting said ports to vacuum lines.

8. A vacuum regulator as set forth in claim 6, said body defining a clean air pocket between said one passage and said control vacuum chamber.

9. A vacuum regulator as set forth in claim 6, said one passage being a suction passage and the other being a jet passage, and said passages converging to form an air discharge passage.

10. A vacuum regulator as set forth in claim 6, and unitary means for adjusting said thermally responsive elements and said valve and bleed aperture arrangement.

References Cited

UNITED STATES PATENTS

| | | | |
|---|---|---|---|
| 3,122,318 | 2/1964 | Null | 236—87 |
| 3,263,925 | 8/1966 | Joesting | 236—87 |
| 3,319,888 | 5/1967 | Creager | 236—87 |

WILLIAM J. WYE, Primary Examiner

U.S. Cl. X.R.

236—39, 80